United States Patent [19]

Galantay

[11] 3,917,833

[45] Nov. 4, 1975

[54] AMINO-SUBSTITUTED BENZOCYCLOHEPTENONES FOR INDUCING SLEEP

[75] Inventor: Eugene E. Galantay, Liestal, Switzerland

[73] Assignee: Sandoz, Inc., E. Hanover, N.J.

[22] Filed: Feb. 26, 1973

[21] Appl. No.: 335,594

[52] U.S. Cl. ............... 424/330; 424/248; 424/250; 424/266; 424/267; 424/274; 424/280; 424/282; 260/571; 260/577; 260/578; 260/247; 260/576
[51] Int. Cl.²...................................... A61K 31/135
[58] Field of Search ............. 260/576, 577; 424/330

[56] References Cited
UNITED STATES PATENTS
3,651,143   3/1972   Galantay........................... 424/330

OTHER PUBLICATIONS
Galantay et al., Chemical Communications, 1970, pp. 754–755.

Primary Examiner—Jerome D. Goldberg
Attorney, Agent, or Firm—Gerald D. Sharkin; Richard E. Vila; Frederick H. Weinfeldt

[57] ABSTRACT

6-amino-7H-benzocyclohepten-7-ones, e.g., 6-amino-7H-benzocyclohepten-7-one, are useful as pharmaceuticals, e.g., as sleep inducing agents.

8 Claims, No Drawings

AMINO-SUBSTITUTED BENZOCYCLOHEPTENONES FOR INDUCING SLEEP

This invention relates to amino-substituted-benzocycloheptenones, and more particularly to 6-amino-7H-benzocyclohepten-7-ones and their non-toxic pharmaceutically acceptable acid addition salts, as well as to pharmaceutical compositions containing such compounds and to the use of such compositions.

The amino-substituted benzocycloheptenones involved in this invention are of the formula I:

I 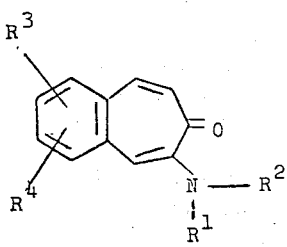

wherein each of $R^1$ and $R^2$, independently, is a hydrogen atom, or lower alkyl;
or $R^1$ and $R^2$ may be joined together with the nitrogen atom of the amino group to form a pyrrolidinyl, piperidinyl, morpholinyl, or an N'-(lower alkyl)-piperazinyl ring; and
  each of $R^3$ and $R^4$, independently, is a hydrogen atom, a halogen atom having an atomic weight of from 19 to 80, i.e., fluoro, chloro or bromo, nitro, lower alkyl, lower alkoxy, or trifluoro(lower)alkyl; or
  $R^3$ and $R^4$ may be joined to form a methylenedioxy unit joining two adjacent carbon atoms; and
non-toxic pharmaceutically acceptable acid addition salts thereof.

In the above-presented definitions, a lower alkyl or the alkyl portion of a lower alkoxy may have, e.g., from 1 to 4 carbon atoms, such as methyl, ethyl, propyl or butyl and may be branched or unbranched, but is preferably unbranched. The trifluoroalkyl radical may have from 1 to 4 carbon atoms, and is preferably trifluoromethyl.

One embodiment of this invention are pharmaceutical compositions containing as an active ingredient thereof, any of the compounds of formula I. Another embodiment of this invention is the use of such compounds as sleep inducing agents. The compounds of formula I are novel, except for the compound wherein each of $R^1$, $R^2$, $R^3$ and $R^4$ is a hydrogen atom, which is known. Hence, all the compounds of formula I except said known compound, are to be regarded as an embodiment of the invention. The novel compounds of this invention may be represented by the formula I':

I' 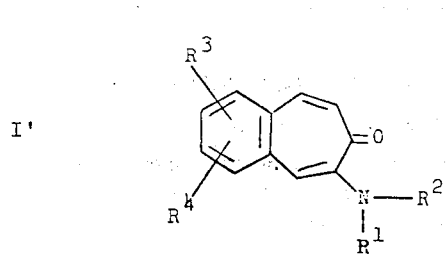

wherein each of $R^1$, $R^2$, $R^3$ and $R^4$ are as defined above, provided that when $R^1$ and $R^2$ are both hydrogen atoms, then $R^3$ and $R^4$ are not both hydrogen atoms. Compounds I' then, are the same Compounds I, except for the known compound wherein $R^1=R^2=R^3=R^4=H$. The known compound is described in the literature, e.g., in Chemical Communications 1970, 754 to 755.

Compounds I may be obtained by converting (process a) the hydroxy function of a compound of formula II, II 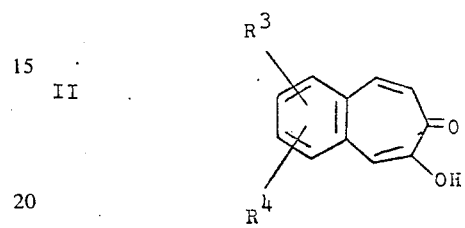

to an amino group of the formula $$-NR^1R^2,$$

wherein $R^1$ and $R^2$ are as defined above.

Process (a) may be carried out by conventional means for converting a hydroxy function to an amino function, e.g., by treatment with a compound III, i.e., an acetate salt of $NH_3$ or an amine of the formula $$HNR^1R^2$$

wherein $R^1$ and $R^2$ are as defined above.

The above-described reaction may be carried out by intimately contacting the reactants, i.e., compound II and III, at a temperature of from about 100° to 250°C. for a period of time sufficient to convert a significant amount of compound II to compound I, e.g., from about 30 minutes to 5 hours. The reaction may be carried out in the presence of an inert solvent, which is liquid under the reaction conditions, e.g., diglyme or dimethyl acetamide, but is preferably carried out in the absence of solvent by holding the reaction mixture in a molten state.

Compounds II are known and may be prepared by methods described in the literature, or where not known, they may be prepared by methods analogous to that described in the literature.

Compounds I wherein both $R^1$ and $R^2$ are hydrogen, i.e., a compound Ia, may alternatively be prepared by acid hydrolysis (process b) of a compound of formula Ib Ib 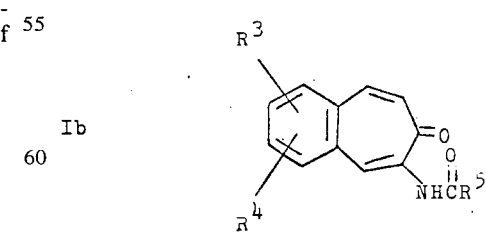

wherein $R^3$ and $R^4$ are as defined above, and $R^5$ is lower alkyl, e.g., having from 1 to 4 carbon atoms, and is preferably methyl. Process (b) may be conveniently carried out by treatment of a Compound Ib with hydrochloric acid, e.g., in a mixture with glacial acetic acid at an elevated temperature, e.g., 100°C. Prolonged treatment results in proportionally increased formation of the corresponding Compound II, which may be converted to the desired Compound I by means of process a). Compounds Ib are known and may be prepared as described in the literature, e.g., Chemical Communications 1970, 754. Those Compounds Ib not known may be prepared in a manner analogous to that for preparing the known compounds.

Compounds I are useful because they have pharmacological activity. In particular, they are useful as sleep inducing agents, as may be demonstrated by inducing sleep in sleep studies in the Cebus monkey (7.5 to 30 mg./kg. p.o.) in which the various stages of sleep are monitored by chronically implanted electrodes and the results compared with controls. Dosages for the use of the Compounds I as a sleep inducer will, of course, vary depending upon known factors. However, in general, saitsfactory results in the use of the compounds of the formula I as sleep-inducers may be obtained on administration at a dose of from 4 to 200 milligrams per kilogram of body weight per os. For most larger mammals the administration of a single dose of from 300 to 2000 milligrams of a compound of the formula I at bedtime provides satisfactory results, desirably administered in admixture with a solid or liquid pharmaceutical carrier or diluent. Divided dosage forms may contain 150 to 1000 milligrams, particularly 150 to 500 mg., in admixture with such a carrier or diluent.

For the above use, the compounds may be combined with a pharmaceutically acceptable carrier, and such other conventional adjuvants, as may be necessary, and administered orally in such forms as tablets, capsules, elixirs, suspensions or solutions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulphate, phosphate and the like and the organic acid salts such as the succinate, benzoate, acetate, maleate, p-toluenesulfonate, benzenesulfonate and the like. Solid compositions, e.g., tablets and capsules are preferred.

The following examples are presented as illustrative of the compounds of this invention and the manner in which such compounds may be prepared and used, and are not intended as in any way limiting the scope of this invention. All temperatures given herein are centigrade and room temperature is 20° to 30°C., unless indicated otherwise.

EXAMPLE 1

6-amino-7H-benzocyclohepten-7-one.

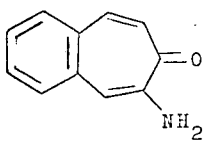

Into a two-necked flask fitted with a condenser and stirrer and under a dry nitrogen atmosphere are added 8.0 g. of 6-acetamido-7H-benzocyclohepten-7-one* and 150 ml. of 2N hydrochloric acid. The mixture is heated over a steam bath with stirring for 3 hours, during which period a precipitate forms. The reaction mixture is cooled to room temperature, filtered, the filtrate extracted with chloroform and the recovered solids dissolved in the extract. The resulting solution is dried by evaporation, then under high vacuum, to obtain a residue comprising 6-amino-7H-benzocyclohepten-7-one and 6-hydroxy-7H-benzocyclohepten-7-one.

*6-acetamido-7H-benzocyclohepten-7-one is also known as 2-acetamido-4,5-benzotropone.

The thus-obtained residue is mixed with 20 g. of ammonium acetate and heated at about 125° for 2 hours. Ice and water are then added to the reaction mixture. The mixture is extracted with chloroform. The chloroform extracts are dried over anhydrous sodium sulfate than evaporated and further volatiles removed under vacuum. The crude product is then distilled and the distilled product recrystallized from chloroform-petroleum ether to obtain refined 6-amino-7H-benzocyclohepten-7-one, m.p. 109° to 111.5°.

Repeating the procedure of this example, described above, but replacing the 2N hydrochloric acid reagent with a mixture of 150 ml. of 4N hydrochloric acid and 150 ml. of glacial acetic acid and employing 2N sodium carbonate solution to neutralize the reaction mixture, the title compound is likewise obtained.

Repeating the procedure of this example, but replacing the 6-acetamido-7H-benzocyclohepten-7-one employed herein with an equivalent amount of a compound of Column A there is obtained the corresponding compound of Column B:

| A | B |
|---|---|
| 1) 3-nitro-7H-benzocyclohepten-6-hydroxy-7-one | 1) 6-amino-3-nitro-7H-benzocyclohepten-7-one |
| 2) 3-chloro-7H-benzocyclohepten-6-hydroxy-7-one | 2) 6-amino-3-chloro-7H-benzocyclohepten-7-one |
| 3) 2,3-dimethoxy-7H-benzocyclohepten-6-hydroxy-7-one | 3) 6-amino-2,3-dimethoxy-7H-benzocyclohepten-7-one |
| 4) 2,3-dichloro-7H-benzocyclohepten-6-hydroxy-7-one | 4) 6-amino-2,3-dichloro-7H-benzocyclohepten-7-one. |

Following the procedure of this example, but replacing the ammonium acetate employed herein with an equivalent amount of the reagent of Column C, there is obtained the product of Column D:

| C | D |
|---|---|
| 1) methylammonium acetate | 1) 6-(N-methylamino)-,7H-benzocyclohepten-7-one |
| 2) dimethylammonium acetate | 2) 6-(N,N-dimethylamino)-,7H-benzocyclohepten-7-one. |
| 3) piperidinium acetate | 3) 6-piperidino-,7H-benzocyclohepten-7-one |

EXAMPLES 2 AND 3

Tablets and Capsules Suitable for Oral Administration

Tablets and capsules containing the ingredients indicated below may be prepared by conventional techniques and are useful in inducing sleep when given h.s.

| Ingredient | Weight (mg.) | |
|---|---|---|
| | Tablet | Capsule |
| 6-amino-7H-benzocyclohepten-7-one-hydrochloride | 150 | 150 |
| tragacanth | 10 | — |
| lactose | 97.5 | 150 |
| corn starch | 25 | — |
| talcum | 15 | — |
| magnesium stearate | 2.5 | — |
| Total | 300 mg. | 300 mg. |

EXAMPLE 4

Oral Liquid Suspension

The following pharmaceutical composition is formulated with the indicated amount of active agent using conventional techniques. The oral liquid suspension represents formulations useful as unit doses and may be administered to induce sleep when given h.s.

| Ingredients | |
|---|---|
| 6-amino-7H-benzocyclohepten-7-one hydrochloride | 150 mg |
| sodium carboxy methyl cellulose U.S.P. | 12.5 mg |
| magnesium aluminum silicate | 47.5 mg |
| flavor | q.s. |
| color | q.s. |
| methyl paraben, U.S.P. | 4.5 mg |
| propyl paraben, U.S.P. | 1.0 mg |
| polysorbate 80 (e.g. Tween 80) U.S.P. | 5 mg |
| sorbitol solution, 70%, U.S.P. | 2,500 mg |
| buffer agent to adjust pH for desired stability | q.s. |
| water | q.s. to 5 ml. |

*q.s. = quantity sufficient

What is claimed is:

1. A method for inducing sleep in a mammal, comprising orally administering to said mammal in need of said treatment, an effective amount for inducing sleep in said mammal of a compound selected from the group consisting of a 7-keto compound of the formula

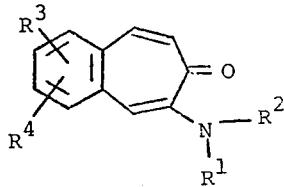

wherein
each of $R^1$ and $R^2$, independently, is a hydrogen atom, or lower alkyl; and
each of $R^3$ and $R^4$, independently, is a hydrogen atom, a halogen atom having an atomic weight of from about 19 to 80, nitro, lower alkyl, lower alkoxy, or trifluoro (lower) alkyl; and non-toxic pharmaceutically acceptable acid addition salts thereof.

2. A method of claim 1 wherein said effective amount is from about 300 milligrams per day to about 2,000 milligrams per day.

3. A method of claim 2 wherein the compound is 6-amino-7H-benzocyclohepten-7-one or a non-toxic pharmaceutically acceptable salt thereof.

4. A method of claim 2 wherein each of $R^1$ and $R^2$ of the compound is a hydrogen atom.

5. A pharmaceutical composition which is suitable for oral administration for inducing sleep comprising an effective amount for inducing sleep in mammals of a compound selected from the group consisting of a 7-keto-compound of the formula

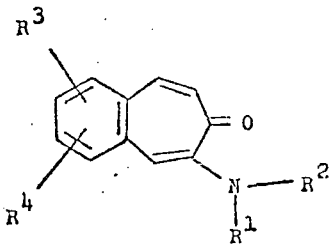

wherein
each of $R^1$ and $R^2$, independently, is a hydrogen atom, or lower alkyl; and
each of $R^3$ and $R^4$, independently, is a hydrogen atom, a halogen atom having an atomic weight of from about 19 to 80, nitro, lower alkyl, lower alkoxy, or trifluoro(lower)alkyl; and
non-toxic pharmaceutically acceptable acid addition salts thereof; and a solid, pharmaceutically acceptable, orally administrable carrier therefor.

6. A pharmaceutical composition according to claim 5 in unit dosage form for inducing sleep wherein the compound is present in an amount of from about 150 milligrams to about 1000 milligrams.

7. A pharmaceutical composition of claim 6 wherein the compound is 6-amino-7H-benzocyclohepten-7-one or a non-toxic pharmaceutically acceptable salt thereof.

8. A composition according to claim 6 wherein each of $R^1$ and $R^2$ of the compound is a hydrogen atom.

* * * * *